United States Patent
Kaushik et al.

(10) Patent No.: US 7,716,646 B2
(45) Date of Patent: May 11, 2010

(54) LOADING A CHAIN OF PROCESSORS FROM AN XML FILE

(76) Inventors: Rekha Kaushik, 611 Sunnybrook Dr., Brentwood, TN (US) 37027; Arvind Wadhawan, 1508 Kemah Ct., Brentwood, TN (US) 37027; Andy McInturff, 13033 Halls Hill Pike, Milton, TN (US) 37118; Warren Patterson, 2 Observatory Rd., Charleston, WV (US) 25314

( * ) Notice: Subject to any disclaimer, the term of this patent is extended or adjusted under 35 U.S.C. 154(b) by 1021 days.

(21) Appl. No.: 11/433,306

(22) Filed: May 11, 2006

(65) Prior Publication Data

US 2007/0266381 A1      Nov. 15, 2007

(51) Int. Cl.
G06F 9/44 (2006.01)
G06F 9/45 (2006.01)

(52) U.S. Cl. .................. 717/126; 717/131; 717/162

(58) Field of Classification Search ......... 717/126–131, 717/162–163
See application file for complete search history.

(56) References Cited

U.S. PATENT DOCUMENTS

| | | | | |
|---|---|---|---|---|
| 5,628,017 | A * | 5/1997 | Kimmerly et al. | 717/127 |
| 6,282,703 | B1 * | 8/2001 | Meth et al. | 717/163 |
| 6,385,764 | B1 * | 5/2002 | Blandy et al. | 717/127 |
| 6,553,564 | B1 * | 4/2003 | Alexander et al. | 717/128 |
| 6,651,243 | B1 * | 11/2003 | Berry et al. | 717/130 |
| 6,654,955 | B1 * | 11/2003 | Kusnitz et al. | 717/163 |
| 6,658,416 | B1 * | 12/2003 | Hussain et al. | 707/10 |
| 6,658,652 | B1 * | 12/2003 | Alexander et al. | 717/128 |
| 6,728,949 | B1 * | 4/2004 | Bryant et al. | 717/127 |
| 6,871,344 | B2 * | 3/2005 | Grier et al. | 717/162 |
| 6,883,163 | B1 * | 4/2005 | Schwabe | 717/126 |
| 6,957,422 | B2 * | 10/2005 | Hunt | 717/130 |
| 6,981,245 | B1 * | 12/2005 | Schwabe | 717/126 |
| 6,988,263 | B1 * | 1/2006 | Hussain et al. | 717/128 |
| 7,055,143 | B2 * | 5/2006 | Ringseth et al. | 717/143 |
| 7,114,150 | B2 * | 9/2006 | Dimpsey et al. | 717/131 |
| 7,225,430 | B2 * | 5/2007 | Eatough et al. | 717/127 |
| 7,386,839 | B1 * | 6/2008 | Golender et al. | 717/131 |
| 7,401,323 | B2 * | 7/2008 | Stall et al. | 717/130 |
| 7,543,286 | B2 * | 6/2009 | Relyea et al. | 717/162 |
| 7,546,587 | B2 * | 6/2009 | Marr et al. | 717/127 |
| 7,631,300 | B2 * | 12/2009 | Muhlestein et al. | 717/131 |
| 2004/0128146 | A1 | 7/2004 | Williams et al. | 705/1 |

OTHER PUBLICATIONS

Yiqing et al, "The implementation of dynamic linking in dynamic binary translation systems", IEEE, pp. 643-646, 2009.*

(Continued)

Primary Examiner—Anil Khatri

(57) ABSTRACT

A method for loading a plurality of dynamically linked assemblies during the execution of an application program is disclosed. The application program reads a configuration file that includes a load sequence for the plurality of dynamically linked assemblies and a class associated with each dynamically linked assembly. The plurality of dynamically linked assemblies are loaded in accordance with the load sequence read from the configuration file. Each class has a common dataset and each of the plurality of dynamically linked assemblies is independent from the other of the plurality of dynamically linked assemblies. A process request defined by the associated class is sent to at least a first of the plurality of dynamically linked assemblies.

14 Claims, 5 Drawing Sheets

OTHER PUBLICATIONS

Michael, "Scalable lock free dynamic memory allocation", ACM PLDI, pp. 35-46, 2004.*

Srivastva et al, "Modular informstion hiding and type safe linking for C", ACM TLDI, pp. 3-13, 2007.*

Fagorzi et al, "Modeling multiple class loaders by a calculus for dynamic linking", ACM SAC, pp. 1281-1288, 2004.*

DEC Data Systems: "DEC Data Systems—DataWise Manual" May 6, 2006, XP002470188, p. 5-p. 6, p. 58-60, p. 129.

Don Landing et al.: "Sensor Data Analysis Framework Research Roadmap—Integrating Stream Processing and Persistent Data Retrieval", Feb. 2006, XP002470189, the whole document.

Harrison M: "EPC Information Service—Data Model and Queries" Internet Citation, Oct. 1, 2003, XP002355668, the whole document.

Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP0011108155, the whole document.

Bonnet P et al: "Querying the Physical World" IEEE Personal Communications, IEEE Communications Society, US, vol. 7, No. 5, Oct. 2000, pp. 10-15, XP000966619, the whole document.

Ledlie J et al: "Provenance-Aware Sensor Data Storage" Data Engineering Workshops, 2005, 21st International Conference on Tokyo, Japan Apr. 5-8, 2005, Piscataway, NJ, USA, IEEE, Apr. 5, 2005, pp. 1189-1189, XP010924091, the whole document.

Kevin Chang et al: "SensorBase.org—A Centralized Repository to Slog Sensor Network Data" Center for Embedded Network Sensing. Papers. Paper 116, May 5, 2006, XP002470190, the whole document.

Written Opinion corresponding to co-pending International Patent Application Serial No. PCT/US2007/011247, European Patent Office, dated May 15, 2008, 12 pages.

International Search Report corresponding to co-pending International Patent Application Serial No. PCT/US2007/011247, European Patent Office, dated May 15, 2008, 8 pages.

* cited by examiner

LOADING A CHAIN OF PROCESSORS FROM AN XML FILE

FIELD OF THE INVENTION

This invention is directed generally to loading a chain of processors, and, more particularly, to loading a chain of processors from an extensible markup language file and modifying a load sequence without having to hard code the modification.

BACKGROUND OF THE INVENTION

In a power monitoring system, various installations send electrical data from data collection nodes to a data collection server. This collected data may then be processed (e.g., filtered, aggregated, etc.) or extracted from a database by an application program. The application program typically utilizes a number of assemblies (e.g., dynamically linked libraries (DLL)) to process the data. These assemblies are dynamically linked with the application program that uses them during program execution rather than being compiled with the main program. The advantage of such assemblies is that, because they need not be loaded into random access memory (RAM) together with the application program, space is saved in the RAM. When and if an assembly is needed, it is loaded into the RAM and run by the application program.

Typical application programs hard code the load sequence for the various assemblies into the application program itself. As such, when the load sequence for the assemblies is to be modified (e.g., the order of the assemblies is changed or an assembly is added or deleted) a programmer must modify the source code and recompile the application program to carry out such a modification.

Thus, a need exists for an improved apparatus and method. The present invention is directed to satisfying one or more of these needs and solving other problems.

SUMMARY OF THE INVENTION

According to one embodiment of the present invention, a method for loading a plurality of dynamically linked assemblies during the execution of an application program is disclosed. The method comprising reading, by the application program, a configuration file that includes a load sequence for the plurality of dynamically linked assemblies and a class associated with each dynamically linked assembly. The method further comprising loading the plurality of dynamically linked assemblies in accordance with the load sequence read from the configuration file. Each class has a common dataset. Each of the plurality of dynamically linked assemblies is independent from the other of the plurality of dynamically linked assemblies. The method further comprising sending a process request defined by the associated class to at least a first of the plurality of dynamically linked assemblies.

According to another embodiment of the present invention, a method for manipulating data from a power-monitoring database with an application program is disclosed. The method comprising reading, by the application program, a configuration file to determine a process order for a plurality of dynamically linked libraries and to determine a respective class associated with each of the plurality of dynamically linked libraries. The method further comprising loading the plurality of dynamically linked libraries in accordance with the process order. Each class of the plurality of dynamically linked libraries has an associated common dataset. The method further comprising responsive to the loading, sending a process request to at least a first of the plurality of dynamically linked libraries in accordance with the process order to cause the first of the plurality of dynamically linked libraries to be executed.

Any of the foregoing methods may be performed by one or more controllers that are directed by instructions encoded in a computer readable storage medium.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

Figure 1:
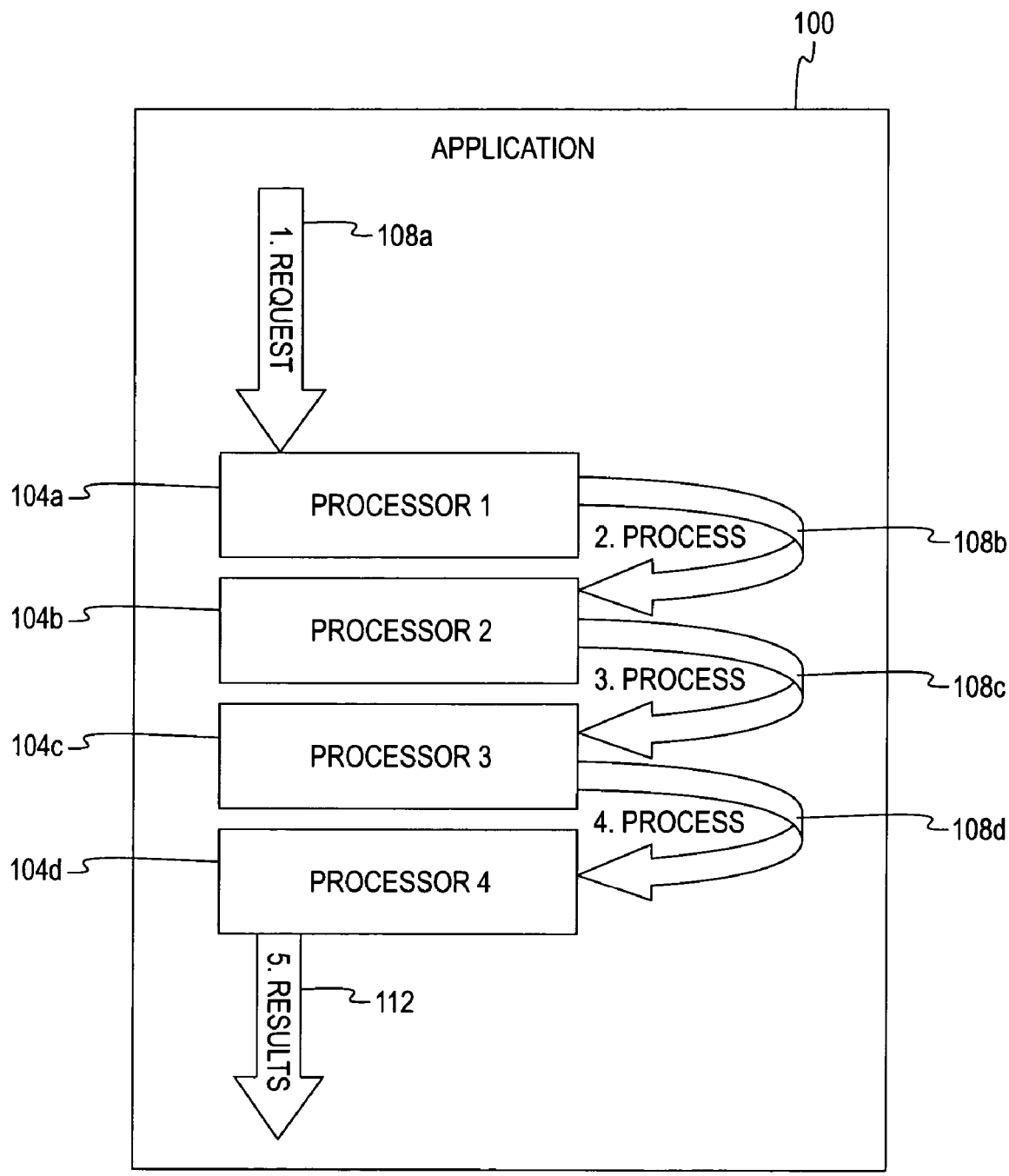
FIG. 1 is a functional block diagram of a prior art application program.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Referring now to the drawings, and initially to FIG. 1, a prior art application program 100 is shown. The application program 100 includes a load sequence for a plurality of dynamically linked assemblies (e.g., processors 104a-d). This load sequence, in prior art application program 100, is hard coded directly within the application program 100 itself. Each of the plurality of dynamically linked assemblies that may be required by the application program 100 is listed in a special table in the executable called, for example, a function import table. This table contains all the names of functions that need to be linked dynamically and the names of libraries (e.g., dynamically linked libraries) in which the assemblies reside. When the application program 100 runs, the libraries, whose names appear in the function import table, are loaded and references to the function calls in the assemblies are resolved with the actual address of the function code.

During execution of the application program 100, the dynamically linked libraries (DLLs) are loaded and the references to the function calls are resolved (i.e., function calls are replaced with the exact addresses of the assemblies in memory). To facilitate this type of linking, DLLs typically have a special table called an export table, containing names of functions that can be linked to dynamically by other application programs or DLLs and the actual addresses for the assemblies. Only functions that appear in the DLL's export table can be linked to dynamically by the application program 100.

When the application program 100 is used, the computer first loads the application program 100 and looks for the DLL names in the application program's 100 import list. The application program 100 checks whether the DLL specified in the import list is already loaded in memory by other application. If the specified DLL is already present in memory then references are resolved with the same instance of the DLL. If the DLL is not already present in memory, a fresh instance is loaded and references are resolved with this newly created instance. All later references to the DLL calls can be resolved with this instance until the DLL is unloaded from the memory.

As illustrated, the hard-coded load sequence is such that the plurality of processors 104a-d (e.g., DLLs) is dynamically loaded into a Random Access Memory (RAM) by a request sent by the application program 100. Once the plurality of processors 104a-d has been loaded into the RAM, the application program 100 sends a request 108a to the first processor 104a specifying the data set for the first processor 104a to process. A second request 108b is then sent to the second processor 104b, a third request 108c is sent to the third processor 104c, and finally, a fourth request 108d is sent to the fourth processor 104d. Each of the plurality of processors 104a-c processes the specified data set and provides an output that the subsequent processor 104b-d can recognize and process. The fourth processor 104d, in the illustrated example, outputs the final results 112 requested by the application program 100.

As discussed, the load sequence of the plurality of processors 104a-d in the prior art application program 100 is hard coded into the application program 100 itself. As such, if a user desires to rearrange the plurality of processors, add a processor, or delete a processor, the user must modify and compile the application program 100 to make such a modification.

Figure 2:
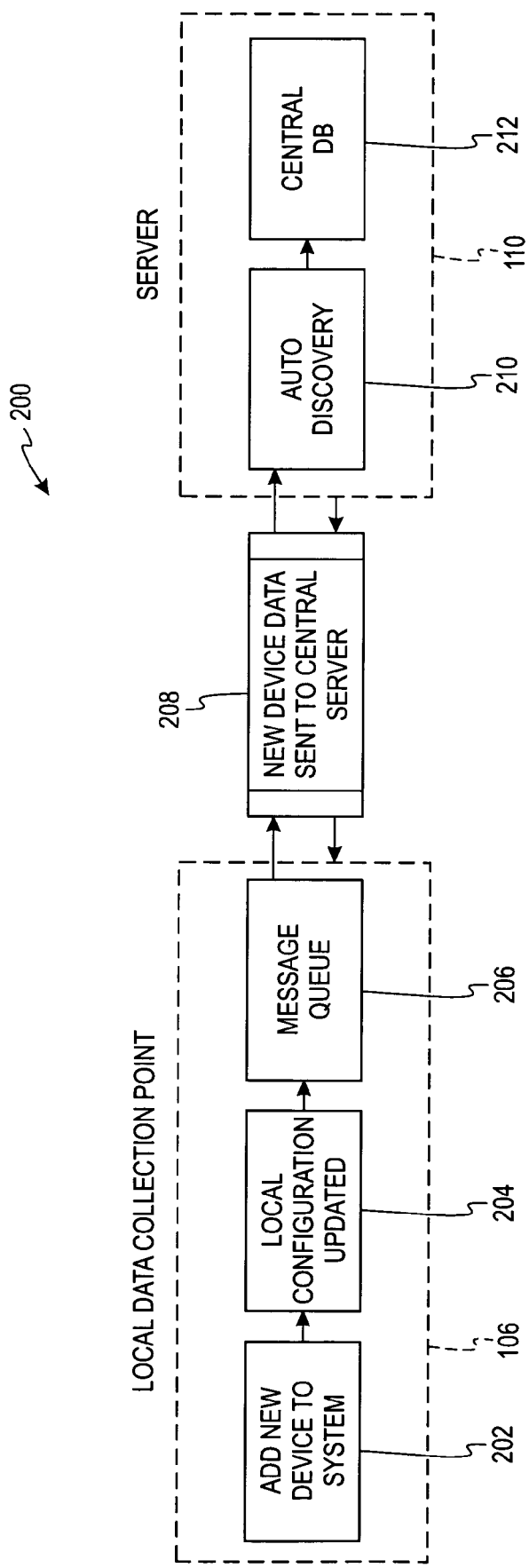
FIG. 2 is a functional block diagram of an application program and configuration file, according to one embodiment of the present invention.

Turning now to FIG. 2, an application program 200 incorporating the present invention is illustrated, according to one embodiment of the present invention. The application program 200 is adapted to load a plurality of dynamically linked assemblies 204 (also called processors) based on a load sequence specified in a configuration file 210. The configuration file 210 is a parseable, text file that contains at least one load sequence for the plurality of dynamically linked assemblies 204 that is readable by the application program 200. In an embodiment, each of the dynamically linked assemblies is independent from the other dynamically linked assemblies.

According to one embodiment, the configuration file 210 is in an extensible markup language (XML) format. The configuration file 210, in an XML format, can be processed purely as data by a program, can be stored with similar data on another computer, or can be displayed. By utilizing XML, a user or programmer can create common information formats and share both the format and the data.

The configuration file 210 specifies the assemblies that are to be loaded, the order the individual assemblies are to be loaded, and the class or classes that will be used for processing. The class implements a standard method that serves as the entry point into the assembly 204. Each of the assemblies 204 implements a standard method within a specific class. Because the method is common to all of the assemblies 204, the configuration file 210 calls the assembly 204 by the standard method to initiate any of the assemblies 204. Therefore, although the signature for each of the plurality of assemblies 204 is the same, the implementation for the plurality of assemblies 204 may be different.

In the illustrated embodiment, when the application program 200 requires dynamically linked assemblies to process data, the application program 200 reads the settings 202 from the configuration file 210. The application program 200 reads the settings 202 to determine the assemblies 204 required, the order to load the assemblies, and the class to use for processing the assemblies 204.

Once the application program 200 has determined the load sequence from the configuration file 210, the application program 200 loads each of the plurality of assemblies 304 in the determined order. A first load signal 206a is sent to load a first processor 204a into the RAM (e.g., into the application program's 200 memory space). A second load signal 206b is sent to load the next processor (i.e., a second processor 204b), a third load signal 206c is sent to load the third processor 204c, and additional load signals are sent until a final load signal 206d is sent to load the final processor 204d into the RAM.

After all of the plurality of processors 204a-d are loaded into the RAM, a first process request 208a is sent to the first processor 204a. A process request is a call to a processor with the class to be used for processing. Once the first processor 204a has finished processing and returned execution back to the application program 200, the application program 200 calls the second processor 204b by sending a second process request 208b. Once the execution from the second processor 204b has been returned to the application program 200, a third process request 208c is sent to the third processor 204c by the application program 200, and this cycle continues until a final process request 208d is sent to the final processor 204d. The results 112 from the final processor 204d are communicated to the application program 200.

As discussed above, each of the assemblies 204 utilizes a common dataset. In one embodiment, each of the assemblies 204 utilizes the .NET framework dataset. Thus, the outputs from each of the processors 204a-d are stored in a .NET framework dataset and the application program interfaces (APIs) for the .NET framework dataset enable the next assembly in the sequence to determine the contents of the dataset being passed to the assembly. Once the results of a query have been fetched from a .NET framework dataset, any changes made to the contents of the dataset by the plurality of assemblies 204 do not affect the database.

In an embodiment, the dataset represents a set of data arranged in tables and includes information about how the data is ordered and constrained within the tables, as well as information specifying the relationships among the tables. The .NET framework dataset allows the contents of the dataset to be saved and loaded to and from files as XML configuration documents. In addition, the .NET framework dataset also allows schema information (e.g., table, column, and constraint information) to be separated into an XML schema file.

Figure 3:
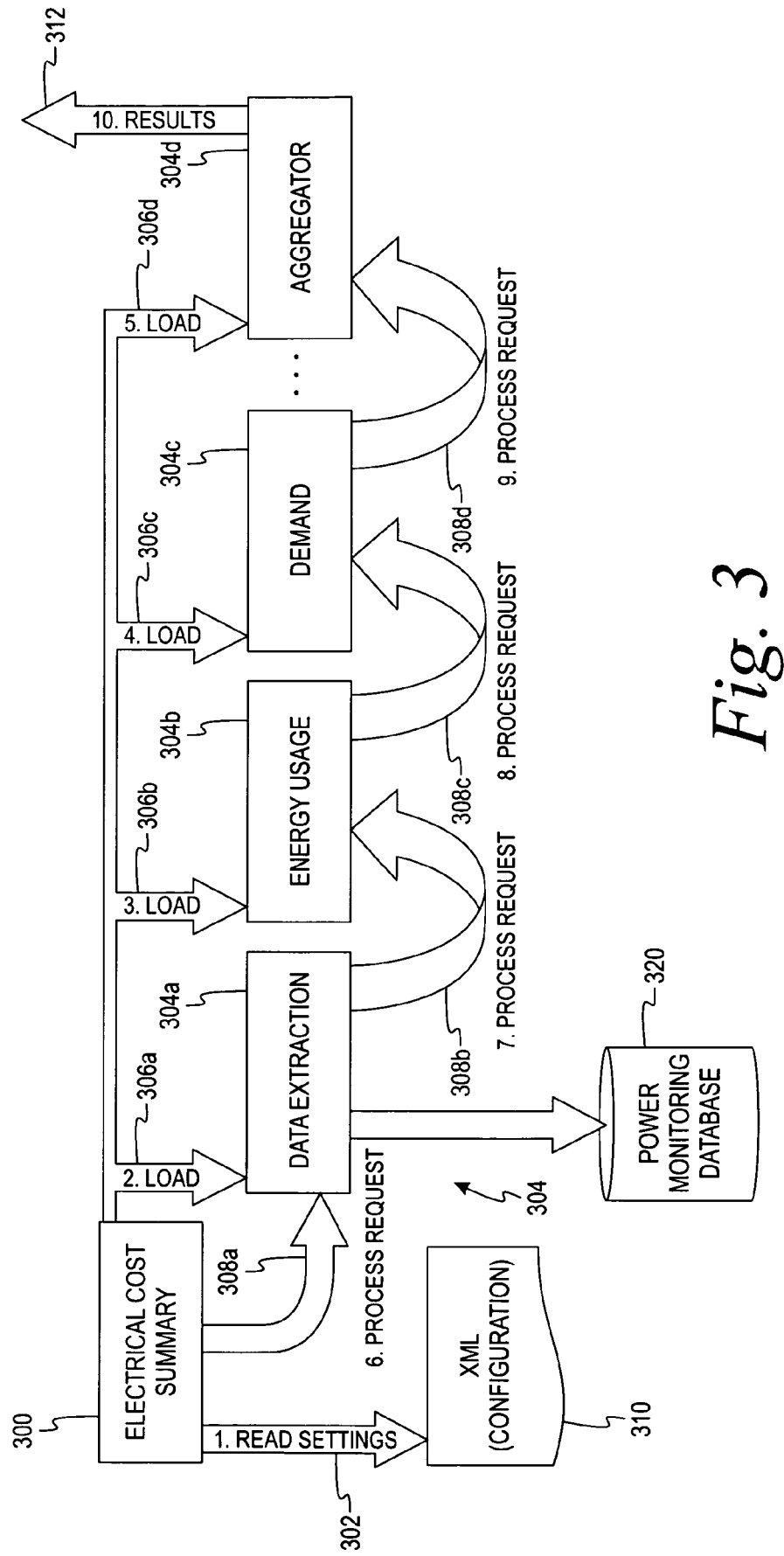
FIG. 3 is a functional block diagram of an application program and a configuration file for use with a power monitoring system, according to one embodiment of the present invention.

Turning now to FIG. 3, an application program 300 and a configuration file 310 for use with a monitoring system is illustrated, according to another embodiment of the present invention. The monitoring system may be any system that monitors measurable characteristics of a utility, including water, air, gas, energy, steam (collectively abbreviated as WAGES), and weather. An implementation is a power monitoring system, and the illustrated embodiment is directed to a power monitoring system; however, it should be understood that the present invention applies as equally to power monitoring systems as to other WAGES monitoring or weather station systems.

A power monitoring system is typically arranged in a hierarchy with monitoring devices such as electrical meters installed at various levels of the hierarchy. Monitoring devices measure various characteristics of the electrical signal (e.g., voltage, current, waveform distortion, power, etc.) passing through the conductors, and the data from each monitoring device is collected by local data collection points within the monitoring system and communicated to one or more power-monitoring databases 320 for storage or analysis.

In an embodiment, the application program 300 processes data and generates reports on the information in the power-monitoring database 320. The application program 300 can be utilized to develop a plurality of reports from the power-monitoring database 320, such as an "electrical cost summary," illustrated in FIG. 3. When an electrical cost summary is desired, the application program 300 reads the settings 302 from the configuration file 310 to determine the required dynamically linked assemblies 304 (e.g., processors 304a-d), the order to load the assemblies, and the class to use for processing.

Once the application program 300 has determined the load sequence from the configuration file 310, the application program 300 loads each of the plurality of assemblies 304 in the determined order. Each of the plurality of assemblies 304 includes at least one function required for developing the electrical cost summary. A first load signal 306a is sent to load a first processor 304a into the RAM (e.g., into the application program's 200 memory space). A second load signal 306b is sent to load the next processor (i.e., a second processor 204b), a third load signal 306c is sent to load the third processor 304c, and additional load signals are sent until a final load signal 306d is sent to load the final processor 304d into the RAM.

After all of the plurality of processors 304a-d are loaded into the RAM, a first process request 308a is sent to the first processor 304a. The first processor 304a provides a data extraction function. The first processor 304a, in the illustrated embodiment, is in communication with the power-monitoring database 320 can query the power-monitoring database 320 and request data therefrom. This data is then formed into a dataset by the first processor 304a that can be recognized and processed by the next assembly in the process order as provided in the configuration file 310.

Once the first processor 304a has finished processing and returned an execution to the application program 300, the application program 300 calls the second processor 304b by sending a second process request 308b. The second processor 304b, in the illustrated example, provides an energy usage function. Thus, the second processor 304b is programmed to determine the energy usage information from the dataset output by the first processor 304a.

Once the execution from the second processor 304b has been returned to the application program 300, a third process request 308c is sent to the third processor 304c. The third processor 304c, in the illustrated embodiment, provides a demand function. Thus, the second processor 304c is adapted to determine the demand information from the dataset output by the second processor 304b. This cycle of calling the loaded assemblies 304 continues until a final one of the plurality of assemblies 304 is reached.

Once the final one of the plurality of assemblies is reached, a final process request 308d is sent to a final processor 304d. The final processor 304d, in the illustrated embodiment, provides an aggregation function. Thus, the final processor 304d is adapted to aggregate the dataset in various ways. The results 212 from the final processor 304d are communicated to the application program 300 and the application program 300 further manipulates, stores, or displays these results as the electrical cost summary.

Figure 4:
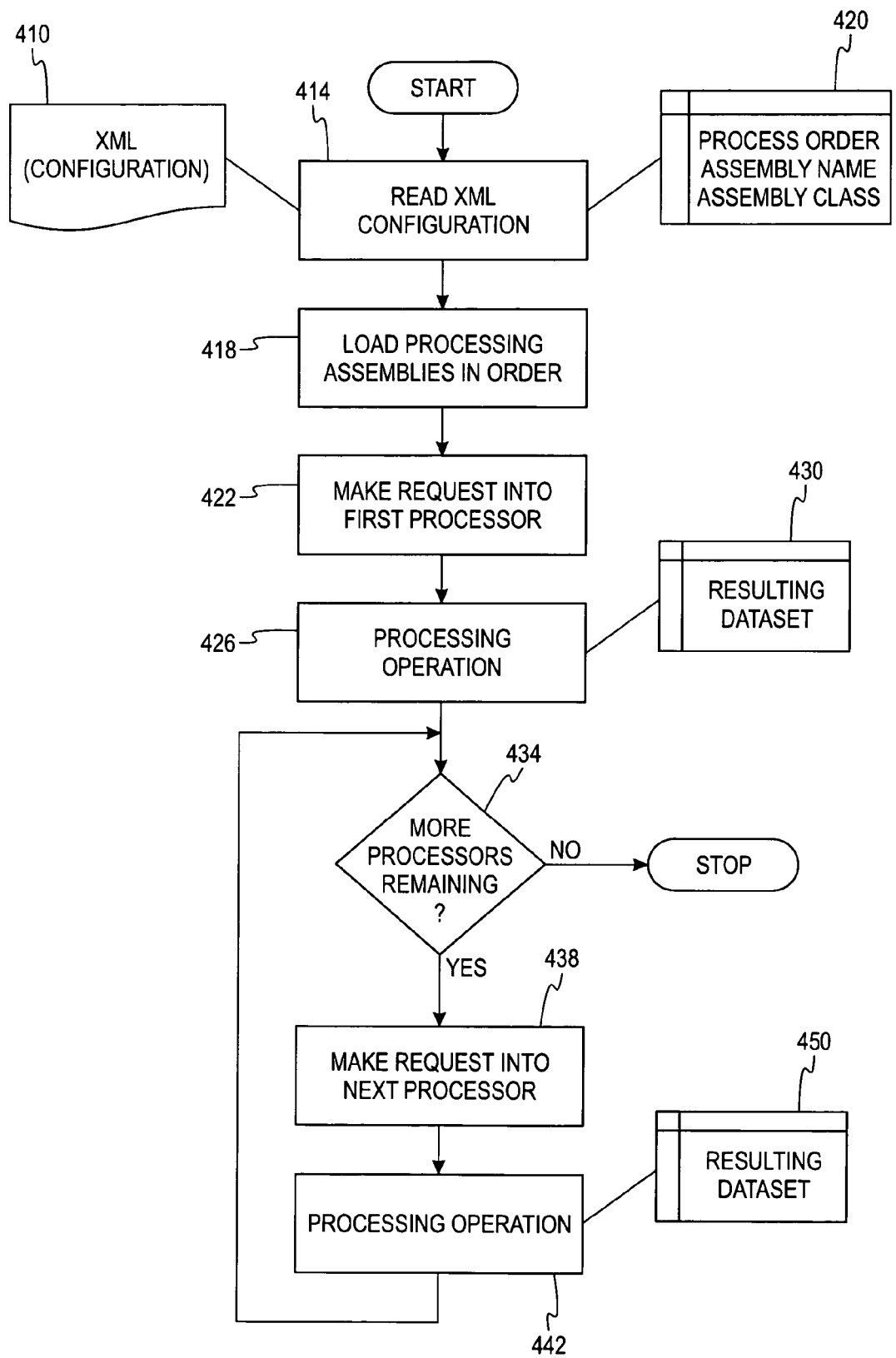
FIG. 4 is a flow chart diagram illustrating a processing model for loading and using dynamically linked assemblies, according to one embodiment of the present invention.

Turning now to FIG. 4, a processing model for loading and using dynamically linked assemblies is illustrated, according to one embodiment of the present invention. An configuration file 410 (e.g., an XML configuration file) is read by the application program 200 at step 414. By reading the configuration file 410, the application program 200 is able to determine the process order, assembly name, and assembly class information 420 for each of the plurality of dynamically linked assemblies 204 to be loaded and used. The application program 200 utilizes the process order and assembly name information to load the processing assemblies 204 in the load sequence at step 418. Once all of the assemblies 204 have been loaded into the memory, the application program 200 makes a process request 208a into the first processor 204a. The first processor 204a performs the processing operation at step 426 and a resulting dataset 430 is generated.

The application program 200 then determines, at decision box 434, whether additional assemblies 204 remain within the process order. If the program 200 determines that there are additional processors remaining in the process order, a process request is made into the next assembly 204 at step 438. The next assembly 204 performs the processing operation at step 442 on the resulting dataset 430 (generated by the previous assembly 204) and another resulting dataset 450 is generated. The application program 200 then determines, at decision box 434, whether additional assemblies 204 remain within the process order. This process continues until the determination is made, at decision box 434, that the final processor 204d has performed its processing operation.

Figure 5:
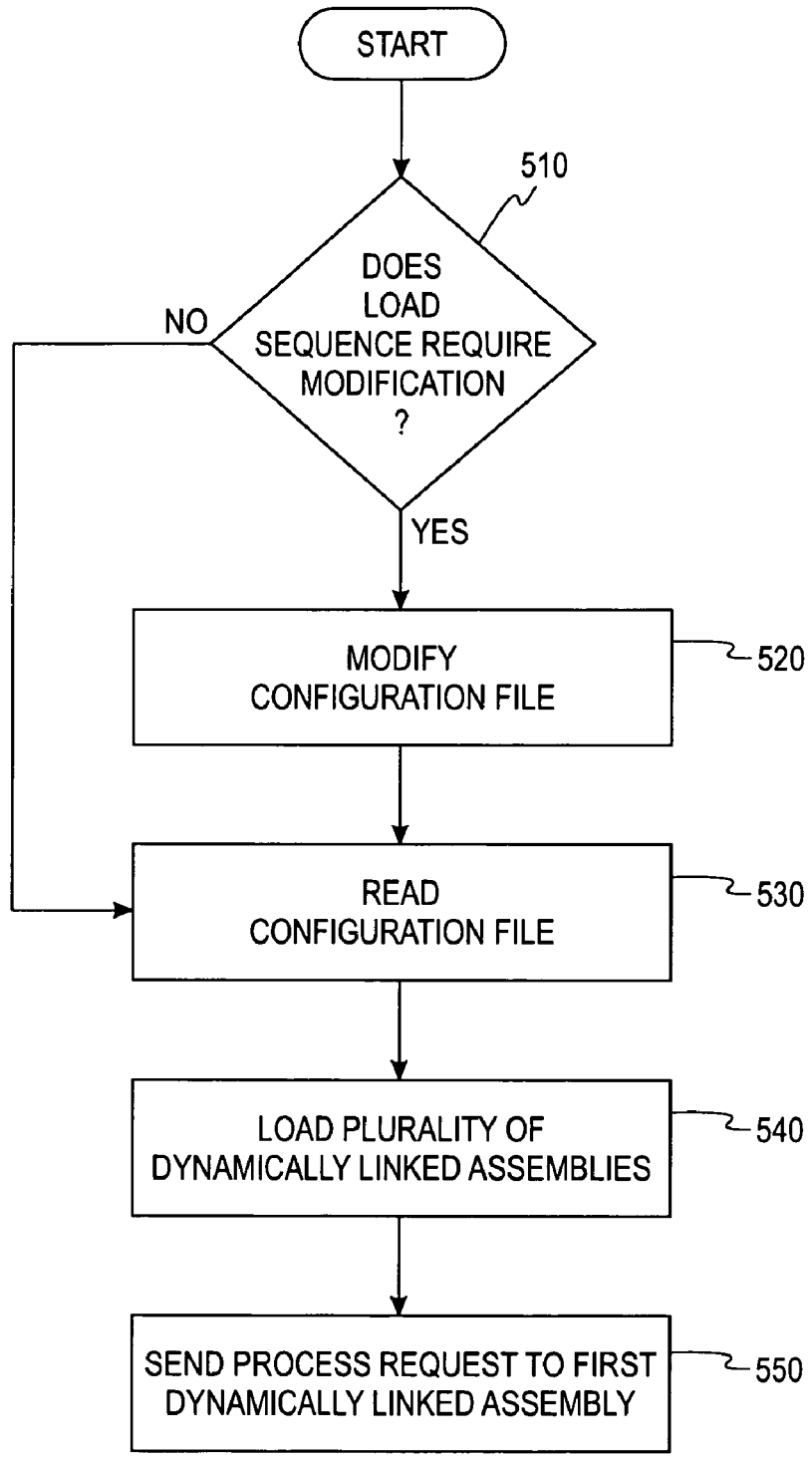
FIG. 5 is a flow chart diagram illustrating a process for modifying a load sequence, according to one embodiment of the present invention.

Referring now to FIG. 5, a process for modifying a load sequence is illustrated, according to one embodiment of the present invention. As discussed above, to determine the load sequence, the application program 200 reads the configuration file 210 and determines the assembly names and the process order for the assemblies 204. Therefore, to modify the load sequence (e.g., rearrange the assemblies, add an assembly, or remove an assembly) only the configuration file 210 needs to be modified. Because the application program 200 is hard coded to determine the load sequence by reading the configuration file 210, and the configuration file is a parseable text file, the textual load sequences within the configuration file 210 can be modified without coding the new sequence into the application program 200. It should be apparent to those skilled in the art that the modification of the load sequence can be accomplished without recoding and recompiling the application program 200 and, in some embodiments, without recoding the configuration file 210.

As illustrated in FIG. 5, a determination is made, at decision box 510, whether the load sequence requires modification. If the load sequence does require modification, the configuration file 210 is modified at step 520 to reflect the new load sequence. This modification to the load sequence occurs without the need for recoding or recompiling the application program 200. Once the configuration file 210 has been modified at step 520, or if the determination is made, at decision box 510, that the load sequence does not require modification, the application program 200 reads the configuration file 210 at step 530. The application program 200 loads the plurality of dynamically linked assemblies 204 into the memory at step 540 according to the load sequence set forth in the configuration file 210, and a process request is sent to the first dynamically linked assembly 204 at step 550.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for loading a plurality of dynamically linked assemblies during the execution of an application program, comprising:

reading, by the application program under control of a computer, a configuration file stored in a memory, the configuration file including a load sequence for the plurality of dynamically linked assemblies and a class used for processing each dynamically linked assembly, the load sequence indicating a determined order for loading the plurality of dynamically linked assemblies;

loading, by the application program under control of the computer, the plurality of dynamically linked assemblies in the determined order indicated by the load sequence read from the configuration file, each class having a common dataset, each of the plurality of dynamically linked assemblies being independent from the other of the plurality of dynamically linked assemblies; and sending, by the application program under control of the computer, a first process request defined by a first of the classes specified in the configuration file for a corresponding first of the plurality of dynamically linked assemblies to the first dynamically linked assembly to cause the first dynamically linked assembly to send a second process request defined by a second of the classes specified in the configuration file for a corresponding second of the plurality of dynamically linked assemblies to the second dynamically linked assembly in the determined order indicated by the load sequence;

responsive to receiving the first process request, processing the first dynamically linked assembly using the first class specified in the configuration file and, responsive to receiving the second process request, processing the second dynamically linked assembly using the second class specified in the configuration file in the determined order indicated by the load sequence; and modifying the load sequence of the plurality of dynamically linked assemblies without modifying the application program as a result of the modifying the load sequence, wherein the modifying includes adding at least one dynamically linked assembly to the plurality of dynamically linked assemblies or rearranging the load sequence of the plurality of dynamically linked assemblies.

2. The method of claim 1, wherein the loading the plurality of dynamically linked assemblies is carried out prior to the sending the first process request.

3. The method of claim 1, further comprising storing the configuration file independently from the application program.

4. The method of claim 1, further comprising creating the configuration file in an extensible markup language format.

5. The method of claim 1, wherein the reading is carried out under the control of a computer coupled to a power monitoring system, the power monitoring system comprising a plurality of monitoring devices that each measures a characteristic of an electrical signal and communicates data indicative of the characteristic to one or more power-monitoring databases for storage therein, the method further comprising:

retrieving, by at least one of the dynamically linked assemblies, data stored in the one or more power-monitoring databases; and the computer executing the at least one of the dynamically linked assemblies using the retrieved data.

6. The method of claim 1, wherein the plurality of dynamically linked assemblies are dynamically linked libraries.

7. A computer readable storage medium encoded with instructions for directing a controller to perform the method of claim 1.

8. A method for manipulating data from one or more power-monitoring databases with an application program, the method comprising:

reading, by the application program under control of a computer coupled to a power monitoring system, a configuration file stored in a memory to determine a process order for a plurality of dynamically linked libraries and to determine a respective class associated with each of the plurality of dynamically linked libraries and used for processing each of the corresponding dynamically linked libraries, the power monitoring system including a plurality of monitoring devices that each measures a characteristic of an electrical signal and communicates data indicative of the characteristic to one or more power-monitoring databases for storage therein;

loading, by the application program under control of the computer, the plurality of dynamically linked libraries in accordance with the process order, each of the classes associated with the plurality of dynamically linked libraries having an associated common dataset;

responsive to the loading, the application program sending a first process request defined by a first of the classes specified in the configuration file for a first of the plurality of dynamically linked libraries to the first dynamically linked library in accordance with the process order to cause the first dynamically linked library to be executed and to send a second process request defined by a second of the classes specified in the configuration file to a second of the plurality of dynamically linked libraries according to the process order to cause the second dynamically linked library to be executed;

responsive to receiving the first process request, processing the first dynamically linked library using the first class specified in the configuration file and, responsive to receiving the second process request, processing the second dynamically linked library using the second class specified in the configuration file in the process order; and modifying the configuration file to change the process order of the plurality of dynamically linked libraries without recompiling the application program as a result of the modifying, wherein the modifying includes adding at least one additional dynamically linked library to the plurality of dynamically linked libraries or rearranging the process order of the plurality of dynamically linked libraries.

9. The method of claim 8, further comprising storing the configuration file independently from the application program.

10. The method of claim 8, further comprising creating the configuration file in an extensible markup language format.

11. The method of claim 8, wherein the configuration file includes an assembly name for each of the plurality of dynamically linked processors, the process order for the plurality of named dynamically linked processors, and the class associated with each of the plurality of dynamically linked processors.

12. The method of claim 8, wherein the common dataset for each class of the plurality of dynamically linked libraries is a dataset defined by the .NET framework.

13. A computer readable storage medium encoded with instructions for directing a controller to perform the method of claim 8.

14. The method of claim 8, wherein the one or more power-monitoring databases are coupled to and receive data from the power monitoring devices, the method further comprising:

retrieving, by at least one of the dynamically linked libraries, data stored in the one or more power-monitoring databases; and the computer executing the at least one of the dynamically linked libraries using the retrieved data.

* * * * *